(12) United States Patent
Sugiura

(10) Patent No.: US 7,665,854 B2
(45) Date of Patent: Feb. 23, 2010

(54) PROJECTION-TYPE DISPLAY APPARATUS

(75) Inventor: Kenji Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 571 days.

(21) Appl. No.: 11/596,556

(22) PCT Filed: Jul. 1, 2005

(86) PCT No.: PCT/JP2005/012216

§ 371 (c)(1),
(2), (4) Date: Nov. 14, 2006

(87) PCT Pub. No.: WO2006/087831

PCT Pub. Date: Aug. 24, 2006

(65) Prior Publication Data

US 2007/0242236 A1     Oct. 18, 2007

(30) Foreign Application Priority Data

Feb. 18, 2005   (JP)   ............... 2005-042688

(51) Int. Cl.
G03B 21/14 (2006.01)
G03B 21/22 (2006.01)
G03B 21/00 (2006.01)

(52) U.S. Cl. .................. 353/119; 353/120; 353/122

(58) Field of Classification Search ................ 353/119, 353/120, 122; 349/11, 16; 396/430, 431
See application file for complete search history.

(56) References Cited

U.S. PATENT DOCUMENTS 6,808,273 B2 * 10/2004 Morinaga ................. 353/119
7,505,066 B2 * 3/2009 Kobayashi et al. ...... 348/207.2
2002/0109822 A1   8/2002 Matsuda et al.
2005/0151933 A1 * 7/2005 Tsai et al. ................. 353/57
2007/0013965 A1 * 1/2007 Iwanaga ................. 358/406

FOREIGN PATENT DOCUMENTS

| JP | 2-1741 U | 1/1990 |
| JP | 4-263237 A | 9/1992 |
| JP | 4-326678 A | 11/1992 |
| JP | 7-244330 A | 9/1995 |
| JP | 07244330 A * | 9/1995 |
| JP | 10215396 A * | 8/1998 |
| JP | 10301162 A * | 11/1998 |

(Continued)

Primary Examiner—Georgia Y Epps
Assistant Examiner—Danell L Owens
(74) Attorney, Agent, or Firm—Birch, Stewart, Kolasch & Birch, LLP

(57) ABSTRACT

In a projection-type display apparatus that projects images onto a screen through a projection lens, even when images, such as setting images of the projection-type-apparatus main unit, that do not need to be displayed on the screen are projected to display, it is also necessary to turn on an expensive light-source lamp whose lifetime is relatively short, resulting in the lifetime of the light-source being shortened. In response to this problem, a lens cover 4 having a display function such as a liquid crystal is therefore used as the lens cover for protecting a projection lens 3, and images that do not need to be displayed onto the screen are displayed on the lens cover 4 having the display function; consequently, light emission from the light-source-lamp is made unnecessary at that time.

3 Claims, 5 Drawing Sheets

FOREIGN PATENT DOCUMENTS

| | | |
|---|---|---|
| JP | 2000-112029 A | 4/2000 |
| JP | 2001-174915 A | 6/2001 |
| JP | 2001-249402 A | 9/2001 |
| JP | 2002-214698 A | 7/2002 |
| JP | 2002-344848 A | 11/2002 |

* cited by examiner

PROJECTION-TYPE DISPLAY APPARATUS

TECHNICAL FIELD

The present invention relates to projection-type display apparatuses using covers having display functions such as liquid crystal display, as lens covers for protecting projection lenses of the apparatuses.

BACKGROUND ART

A conventional projection-type display apparatus such as an apparatus whose display device is made using a liquid-crystal panel is configured in such a way that, after light radiated from a light-source lamp and reflected by a reflector has been separated into predetermined colored light segments through a plurality of dichroic mirrors, and then each of the segments is made incident on the liquid-crystal panel segments corresponding to R, B, and G, through a polarizing beam splitter, to be modulated with imaging signals, etc., each of the segment is focused through another dichroic mirror and a dichroic prism, and projected onto a screen through a projection lens.

As described above, the projection-type display apparatus is structured by including, for example, a case for housing therein a display device composed of a light source lamp, optical parts, and a liquid crystal panel, a control board for controlling image data, and an electric-power board, and a projection lens provided on the front of this case. Moreover, when the apparatus is not operated, in order to protect the projection lens or prevent accumulation of dust, a lens cap is provided on the projection lens or a cover is placed upon the lens; therefore, if electric power is applied, and light radiated from the light-source lamp with the lens cap or the cover being placed thereupon, the light outputted through the projection lens is projected to the lens cap or the cover, and due to heat from the light, not only the lens cap or the cover is deformed, but also the temperature inside the apparatus increases; consequently, a problem has occurred in which the lifetime of the projection-type display apparatus is shortened.

In order to overcome this problem, apparatuses are disclosed that detects the lens cap being placed, and then, shuts down the lamp source (for example, refer to Patent Document 1), and in which an electric-power-source inlet is arranged dose to the projection lens so as not to supply electric power thereto when the lens cap is placed (for example, refer to Patent Document 2).

However, projection-type display apparatuses have proliferated which have functions in which an operation is performed while looking at a menus projected on the screen, when setting states of the apparatus are checked or changed, especially, in more recent sophisticated-and-multifunctional displays. Therefore, lamps for the light sources tend to be used so much used even when the set does not display a broadcast or playback image.

[Patent Document 1] Japanese Laid-Open Patent Publication 112,029/2000 (FIG. 1, FIG. 2)

[Patent Document 2] Japanese Laid-Open Patent Publication 344,848/2002 (FIG. 1)

DISCLOSURE OF THE INVENTION

In the technology disclosed in Patent Document 1, because the lamp source itself is not switched on, a problem has occurred in which a user who is not familiar with the apparatus improperly takes it as malfunctional.

Moreover, in the technology disclosed in Patent Document 2, because an electric-power-source inlet is arranged on the front face that can be said to be "the face of the product", a problem has occurred in which designing flexibility declines. Furthermore, when the menus of the projection-type-display-apparatus main system are set or checked on the display screen, a problem has occurred in which the setting of the projection state is needed only for performing this operation. In addition to, the light-source lamp, whose cost is relatively high and lifetime is relatively short, must be used so much.

A projection-type display apparatus according to a first aspect of the present invention includes: an optical part provided in a case thereof, a display device for modulating light from the optical part into imaging light based on an imaging signal; a projection lens for projecting the imaging light onto a screen; and a lens cover for protecting the projection lens; the lens cover having a display function for displaying an image based on the imaging signal from the projection-type display apparatus, and enabling the imaging light to radiate through the projection lens only when the lens cover uncovers the projection lens.

In a projection-type display apparatus according to a second aspect of the present invention, the lens cover has a touch-panel function, so as to enable set and control the projection-type-display-apparatus main unit by the touch-panel.

In a projection-type display apparatus according to a third aspect of the present invention, the lens cover has a remote-control function, and is configured to be attachable to and detachable from the projection-type-display-apparatus main body, so as to set and control the projection-type display apparatus by remote-control.

According to a projection-type display apparatus of the present invention, because the imaging light can be radiated through the projection lens only when the lens cover is positioned to uncover the projection lens, deformation of the lens cover due to the heat of the imaging light can be prevented, and the lifetime of the projection-type display apparatus can be extended. Moreover, by displaying onto the lens cover having a display function setting information, etc., which do is unnecessary to be projected, the projection setting of the projection-type display apparatus is unnecessary, and also images are displayed without using the light-source lamp whose cost is relatively high and lifetime is relatively short.

Moreover, according to a projection-type display apparatus of the present invention, because the lens cover has a touch panel function, it can easily perform the setting and controlling of the projection-type-display-apparatus main system and control buttons, etc. for the setting and controlling are unnecessary.

Furthermore, according to a projection-type display apparatus of the present invention, because the lens cover has a remote control function and is configured to be attachable to and detachable from the projection-type-display-apparatus main body, the lens cover as the remote controller can be stored in a state in which the cover is attached to the main body, therefore users need not worry about losing the remote controller, etc.

BEST MODE FOR CARRYING OUT THE INVENTION

Embodiment 1

Figure 1:
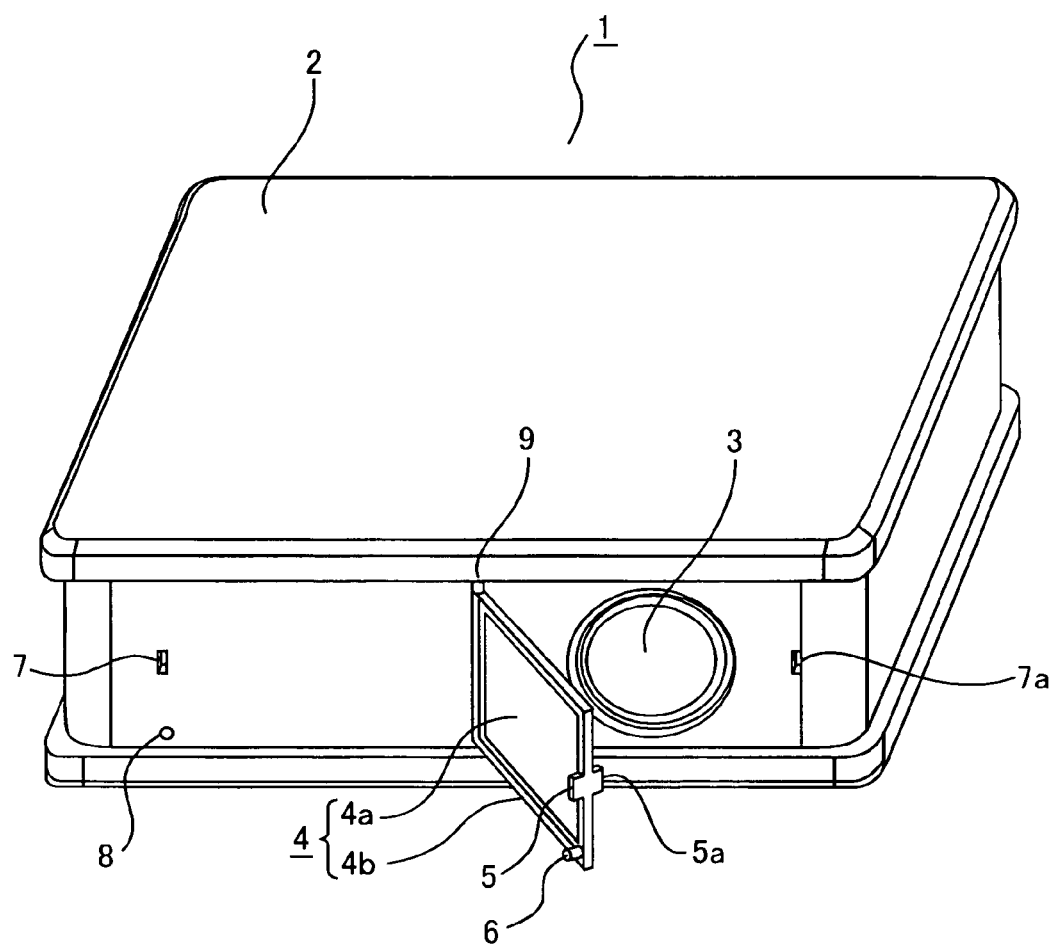
FIG. 1 is a perspective view illustrating a projection-type display apparatus according to Embodiment 1 of the present invention.

FIG. 1 is a perspective view for explaining Embodiment 1 of a projection-type display apparatus according to the present invention. A projection-type display apparatus 1, in which a projection lens 3 is generally located in front of a case 2, and a lamp as a light source, optical parts such as a reflector, a mirror and a prism that are not illustrated in this figure, and a display device such as a liquid-crystal panel for modulating light from the optical parts based on image signals into imaging light are also installed inside the case, so as to form an optical pass, projects images, etc. onto a forward screen, through the projection lens 3. In the projection-type display apparatus 1 according to Embodiment 1, a lens cover for protecting the projection lens 3 provided in front of the case 2 has a display function for displaying images based on imaging signals from the projection-type display apparatus, for example, a lens cover 4 having its own back-lit liquid crystal panel, in which a liquid crystal panel unit 4a is fixed to a lens cover unit 4b.

At the left side of this liquid-crystal-panel-mounted lens cover 4, an axis 9 for pivotally connecting the liquid-crystal-panel-mounted lens cover 4 is provided on the case. By pivoting the liquid-crystal-panel-mount lens cover 4 centered on this axis 9, the projection lens 3 is uncovered and covered for protecting itself.

Regarding the projection lens 3 being covered for protection, the projection lens 3 is covered to enable the protection by an engaging pawl 5a provided on the liquid-crystal-panel-mount lens cover 4 being engaged with an engaging hole 7a provided on the case 2. Whereas, regarding the projection lens being uncovered, by pivoting of the liquid-crystal-panel-mount lens cover 4 centering on the axis 9, and by disengaging pawl 5 from engaging hole 7a and engagement with hole 7, provided on the case 2, the projection lens 3 can be uncovered.

Moreover, the liquid-crystal-panel-mount lens cover 4 is connected to an electrical circuit, which is not illustrated in the figure, included inside the case 2 using a card-shaped circuit board, etc.; thereby, images can be displayed on the liquid crystal panel unit 4a in accordance with imaging signals from this electrical circuit. Furthermore, a convex member 6 for operating a switch included inside the case is provided on the liquid-crystal-panel-mount lens cover 4, and when the engaging pawl 5 is engaged with the engaging hole 7 provided on the case 2 by pivoting of the liquid-crystal-panel-mount lens cover, the convex member 6 pushes down, passing through a hole 8 for operating a switch inside the case, the switch detecting the uncovering of the projection lens.

Next, the operation of this arrangement is explained. When the liquid-crystal-panel-mount lens cover 4 is positioned to cover the projection lens 3, the liquid crystal panel unit 4a is in a state to be viewed from the front side of the projection-type display apparatus 1; therefore, by displaying images on the back-lit liquid crystal panel unit 4a in accordance with imaging signals from the electrical signals generated inside the case 2, that is, by displaying the system setting and by displaying the images which will be subsequently displayed through the projection lens on a trial basis, a check can be performed. If the liquid crystal panel unit 4a is made as a touch panel, input operation of the system settings can be performed using this liquid crystal panel unit 4a.

Moreover, when by pivoting the liquid-crystal-panel-mount lens cover 4, and by engaging the engaging pawl 5 with the engaging hole 7 provided on the case 2, the projection lens 3 is positioned to be uncovered, the convex member 6 pushes down, passing through the hole 8, to engage the switch for detecting uncovering of the projection. Due to this operation of the projection-lens-uncovering detecting switch, the images which were being heretofore displayed on the liquid crystal panel unit 4a of the liquid-crystal-panel-mount lens cover 4 are now instead projected through the projection lens 3, in accordance with light having radiated from the light-source lamp inside the case 2 and passed through the optical parts. That is, only when the liquid-crystal-panel-mount lens cover 4 is positioned to uncover the projection lens 3, imaging light can be radiated from the projection lens 3, meanwhile when the liquid-crystal-panel-mount lens cover 4 is in state not engaging with the engaging hole 7, that is, during from a state in which the lens cover is engaged with the engaging hole 7a to until just before the lens cover is engaged with the engaging hole 7, the imaging light is not radiated from the projection lens 3.

Figure 2:
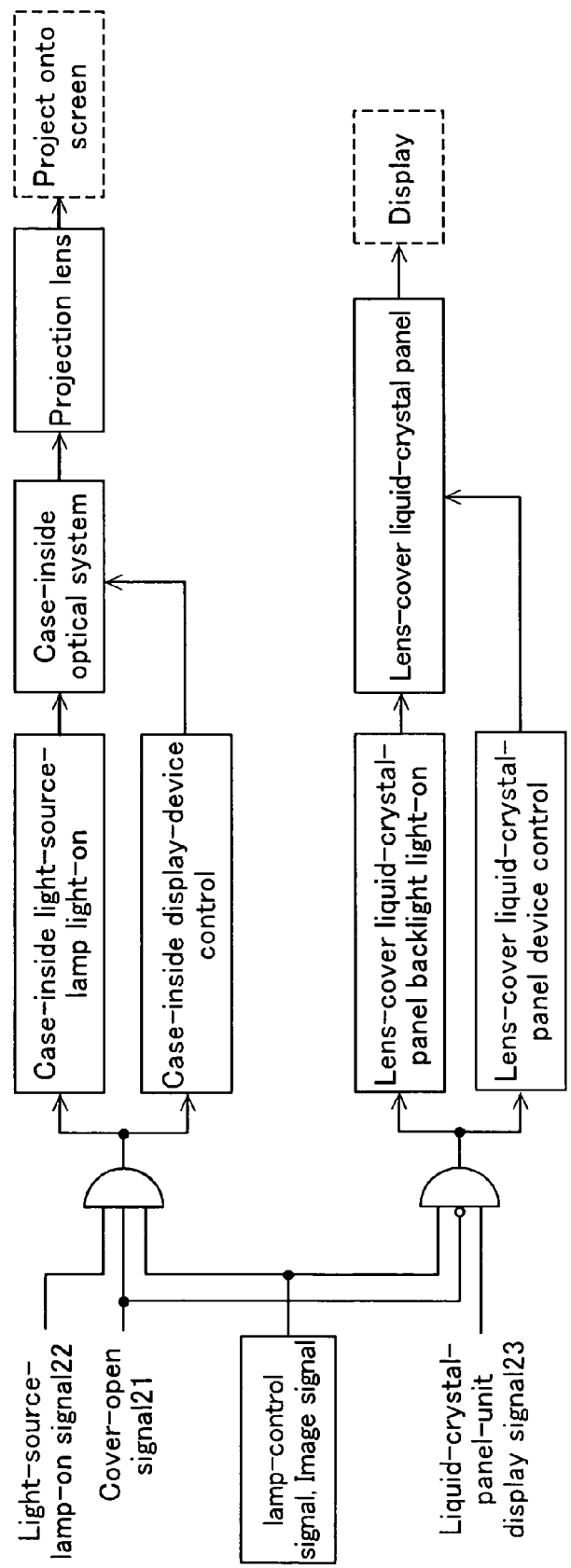
FIG. 2 is a logical diagram illustrating a signal-switching operation of the projection-type display apparatus according to Embodiment 1 of the present invention.

Next, an example the of logic that switches to displaying images from the projection lens 3 or to displaying images on the liquid-crystal-panel-mount lens cover 4 is explained based on FIG. 2.

In FIG. 2, when the liquid-crystal-panel-mount lens cover 4 covers the projection lens 3, because a cover-open signal 21 from the projection-lens-uncovering detecting switch is "off", even if a light-source-lamp-on signal 22 is "on", light is not radiated from the projection lens 3; therefore, deformation of the liquid-crystal-panel-mount lens cover 4 due to heat can be prevented. At that time, by performing the setting of the display parameters using the liquid crystal panel unit 4a, a liquid-crystal-panel-unit display signal 23 turns "on"; along with its own backlight, consequently, the images can be displayed on the liquid crystal panel unit 4a in accordance with the image signals generated by the electrical circuit inside the case 2.

When by opening the liquid-crystal-panel-mount lens cover 4 and engaging the engaging pawl 5 with the engaging hole 7 provided on the case 2, the projection lens 3 is positioned to be uncovered, the cover-open signal 21 from the projection-lens-uncovering detecting switch turns "on"; then, the image signals heretofore displayed on the liquid crystal panel unit 4a of the liquid-crystal-panel-mount lens cover 4 are instead directed to internal LCD unit radiated from the light-source lamp inside the case 2 and passed through the internal LCD and optical parts, meanwhile the display on the liquid crystal panel unit 4a disappears at that unit is turned off.

According to Embodiment 1, except when the liquid-crystal-panel-mount lens cover 4 is positioned to uncover the projection lens 3, because images are not projected in accordance with light having radiated from the light-source lamp and passed through the optical parts inside the case 2, deformation of the lens cover can be prevented, and the lifetime of the projection-type display apparatus 1 can be extended. Moreover, when projection onto a screen is not needed, for example, when a projection-type-display-apparatus main system is set up of adjusted, because images can be outputted to the liquid crystal panel unit 4a of the liquid-crystal-panel-mount lens cover 4, the images can be displayed thereon without using the light-source lamp whose cost is relatively high, and whose lifetime is relatively short; consequently, the effective lifetime of the light-source lamp can be extended. Moreover, if a touch panel is used as the panel unit 4, button switches, etc. for setting up the system can be omitted.

The axis 9 of the liquid-crystal-panel-mount lens cover 4 is not limited to being provided on the left side of the case, but may be provided on the right side of the case depending on the location of the projection lens. Moreover, the engagement of the liquid-crystal-panel-mount lens cover 4 and the case 2 need not be performed by the engaging pawl; for example, by using magnetic force or by setting the frictional resistance of the axis to be relatively high, the cover may be supported at the position where the projection lens is uncovered.

Embodiment 2

Figure 3:
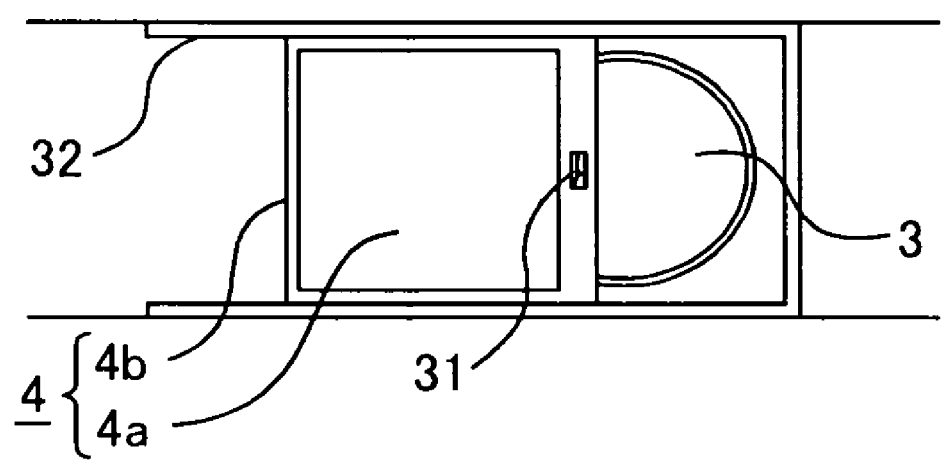
FIG. 3 is a front view illustrating part of a projection-type display apparatus according to Embodiment 2 of the present invention.

FIG. 3 is a front view illustrating a lens cover in Embodiment 2 of a projection-type display apparatus according to the present invention. Regarding the same or similar elements as those in FIG. 1 for explaining Embodiment 1, the same numerals are used, and an explanation is omitted. In FIG. 3, the liquid-crystal-panel-mount lens cover 4 is fixed to be able to slide, by application of force to a knob 31, in the right and left directions along a guide 32; therefore, in an example represented in FIG. 3, when the cover is moved to the right, the projection lens 3 is covered, meanwhile when the cover is moved to the left, the projection lens 3 is uncovered. Naturally, depending on the position where the projection lens is fixed, these directions may be reversed. Moreover, although not illustrated in the figure, similarly to Embodiment 1, the liquid-crystal-panel-mount lens cover 4 is supported, due to a latch mechanism, at positions where the projection lens 3 is covered and uncovered; additionally, a detection switch for detecting the uncovering of the projection lens by detecting the position of the liquid-crystal-panel-mount lens cover 4 is provided. Because the remaining configurations and operations are the same as those in Embodiment 1, an explanation is omitted.

According to Embodiment 2, because the liquid crystal panel unit 4a can be viewed from the front side of the unit independently of the position of the liquid-crystal-panel-mount lens cover 4, in addition to the effect in Embodiment 1, images can be displayed on the liquid crystal panel unit 4a even though the images are simultaneously projected through the projection lens; therefore, the displaying operation of the projector can be controlled in real time from the liquid crystal panel; consequently, the button switches, etc. for the operation can be omitted.

Embodiment 3

Figure 4:
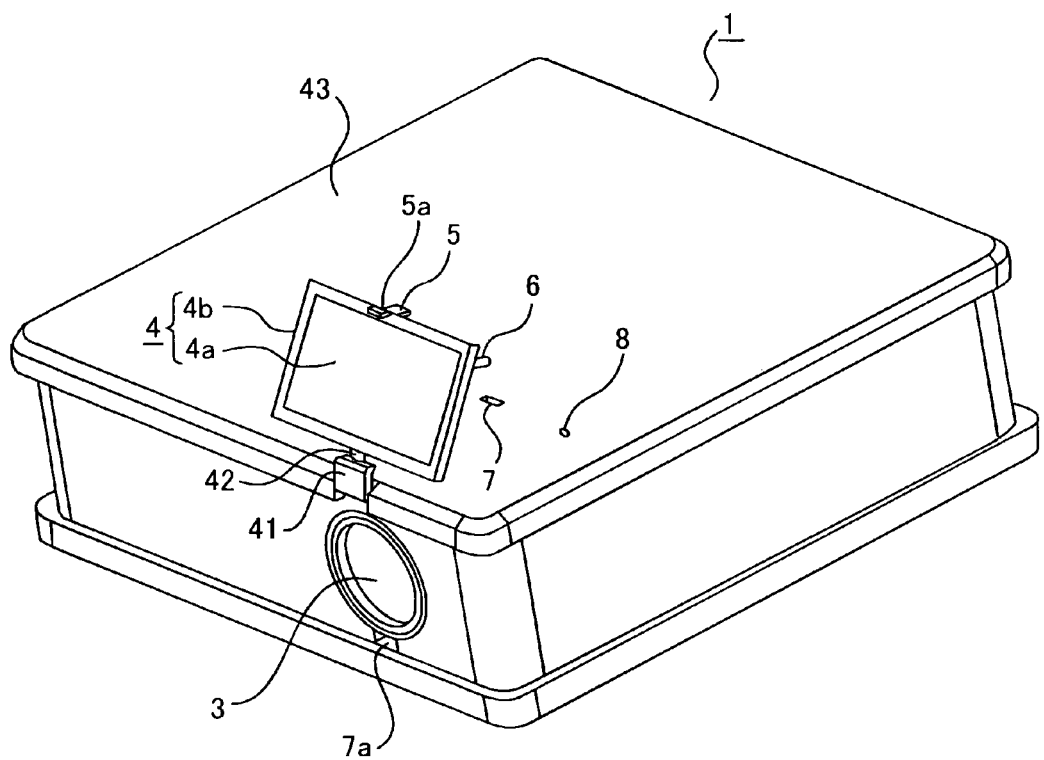
FIG. 4 is a perspective view illustrating a projection-type display apparatus according to Embodiment 3 of the present invention.

FIG. 4 is a perspective view for explaining Embodiment 3 of a projection-type display apparatus according to the present invention. In FIG. 4, because the projection-type display apparatus 1 is approximately equivalent to that in Embodiment 1, with respect to the same or similar elements as those in FIG. 1, the same numerals are used, and the explanation is omitted. A pivot unit 41 for connecting the liquid-crystal-panel-mount lens cover 4 so as to open the cover upwards is provided, above the projection lens 3, on the case 2, and the pivot unit 41 is also connected to another pivot unit 42; thereby, the liquid-crystal-panel-mount lens cover can pivot to a position above the case top 43 of the projection apparatus 1, and can also pivot with respect to the case top.

Moreover, the engaging pawl 5 for engaging the case 2 and switch operating convex member 6 are provided on the liquid-crystal-panel-mount lens cover 4. Furthermore, the engaging hole 7, the switch-operation hole 8, and the inside switch, which is not illustrated, are also provided on the case 2 similarly to the configuration in Embodiment 1. When the liquid-crystal-panel-mount lens cover 4 is fixed to the case top 43, the cover is fixed so that the liquid crystal panel unit 4a faces upward. In this state, the user can perform the setting, etc. for the projection apparatus, based on the display on the liquid crystal panel unit 4a.

When the liquid-crystal-panel-mount lens cover 4 is positioned to the case-top side in which the projection lens 3 is uncovered, the inside switch, which is not illustrated, operates similarly to Embodiment 1; then, it becomes possible to project images through the projection lens 3, in accordance with light having radiated from the light-source lamp inside the case 2 and passed through the optical parts. Moreover, at that moment, the projection apparatus can also be controlled using the display of the liquid crystal panel unit 4a, and in this case, buttons for controlling the projection-type-display-apparatus main system are displayed on the liquid crystal panel unit 4a, which can function as touch-panel buttons for controlling the projection-type-display-apparatus main system.

According to Embodiment 3, because the liquid-crystal-panel-mount lens cover 4 can be operated in a state in which the liquid-crystal-panel-mount lens cover 4 is fixed on the case top of the projection apparatus so as to face upward, the user can operate the cover's touch pad from the lateral sides or the backside of the projector, while easily viewing the projected output at the same time; therefore, the operability can be improved.

Embodiment 4

Figure 5:
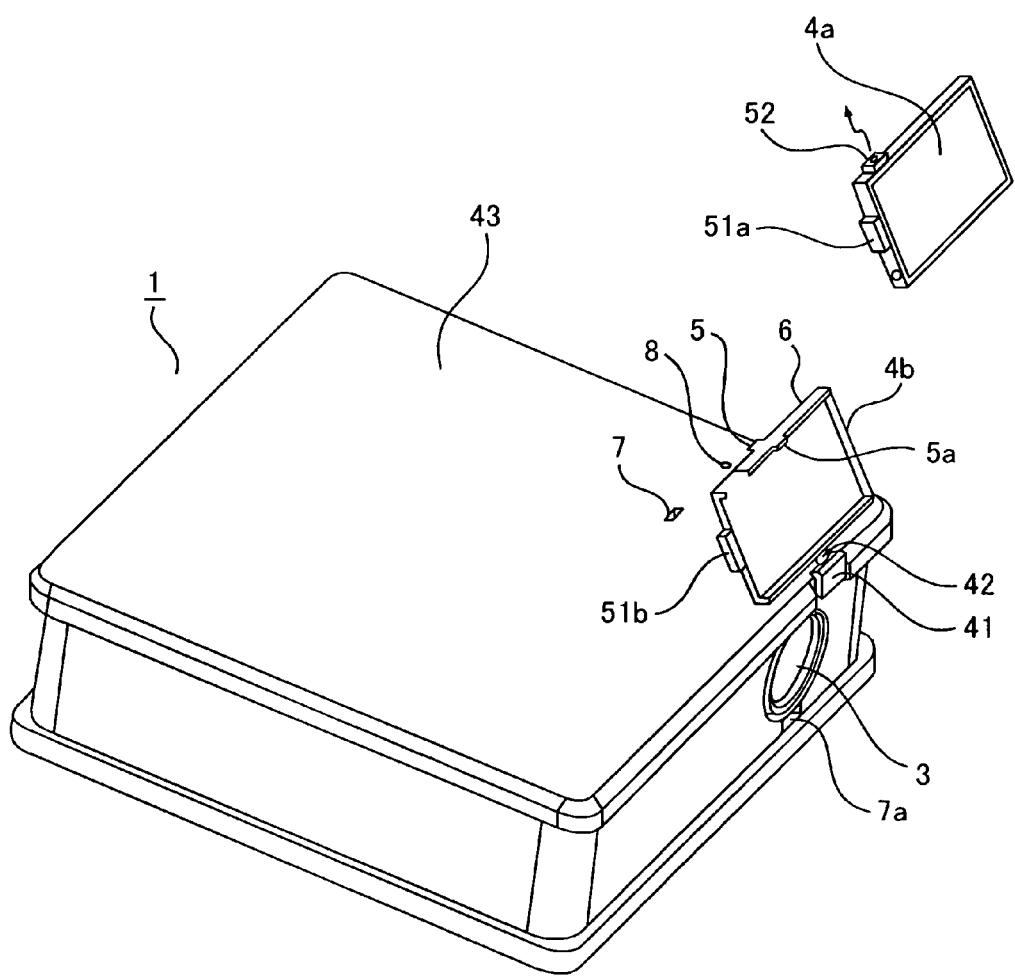
FIG. 5 is a perspective view illustrating a projection-type display apparatus according to Embodiment 4 of the present invention.

FIG. 5 is a perspective view for explaining Embodiment 4 of a projection-type display apparatus according to the present invention, and in this figure, a state is represented in which the liquid crystal panel unit 4a is removed from the lens cover unit 4b. An explanation is performed based on FIG. 5. Because the projection-type display apparatus 1 according to Embodiment 4 is approximately equivalent to that in Embodiment 3, with respect to the same or similar elements, the same numerals are used, and the explanation is omitted. The liquid-crystal-panel-mount lens cover 4 is structurally and electrically connected to the liquid crystal panel unit 4a and the lens cover unit 4b by a pair of push-pull connectors 51a and 51b. Moreover, a function of outputting control signals from an infrared generator 52, etc. and a battery for driving the liquid crystal panel unit 4a by itself are provided, so that the panel unit 4a can be used as a remote control.

The operation to uncover the projection lens 3, of the lens cover unit 4b is similar to that in Embodiment 3; however, in this embodiment, by removing the liquid crystal panel unit 4a from the lens cover unit 4b, the buttons for setting and controlling the projection-type-display-apparatus main system are displayed on the liquid crystal panel unit 4a. In this state, the liquid crystal panel unit 4a is driven by the built-in battery. It becomes possible for a user to remote control the projection-type-display-apparatus main system using the removable liquid crystal panel unit 4a. Because the remaining configuration and operation is similar to that of Embodiment 3, the explanation is omitted.

According to Embodiment 4, because it becomes unnecessary to provide an additional remote controller for the projection-type display apparatus 1 for controlling the apparatus main system, a critical cost reduction becomes possible;

moreover, because the liquid crystal panel unit 4a and remote controller can be stored in a state in which the unit is attached to the projection-type-display-apparatus main body, one need not worry about losing the remote controller, etc.

In Embodiment 4, although the liquid crystal panel unit 4a has been made as a wireless-type remote controller, a method may also be applied in which the control signals are transmitted over a wired system.

In the above embodiment, it has been explained that the lens cover is provided with a liquid crystal panel; however, it is obvious that the same effect can be obtained if the panel is any type of flat display panel, which can be made compact such as a plasma display panel, an LED panel, or an EL (electroluminescence) panel, other than the liquid crystal panel.

Moreover, when the lens is uncovered, the lens cover need not be fixed to the case, but may be configured to be connected to the apparatus main body using, for example, a cable for transmitting imaging signals from the display apparatus.

INDUSTRIAL APPLICABILITY

A projection-type display apparatus according to the present invention can be used as a display apparatus such as a projector.

What is claimed is:

1. A projection display apparatus comprising: an optical part provided in a case of the apparatus;
   a display device for modulating light from the optical part into imaging light based on an imaging signal;
   a projection lens for projecting the imaging light onto a screen; and
   a lens cover for protecting the projection lens, the lens cover: having a display function for displaying an image based on the imaging signal from the projection display apparatus, and for enabling the imaging light to radiate through the projection lens only when the projection lens is uncovered.

2. A projection display apparatus as recited in claim 1, wherein the lens cover has a touch-panel function, so as to enable setting and controlling the projection-display-apparatus main unit by the touch-panel function.

3. A projection display apparatus as recited in claim 1 or 2, wherein the lens cover has a remote-control function, and is configured to be attachable to and detachable from the projection-display-apparatus main unit, so as to enable setting and controlling the projection display apparatus by the remote-control function.

* * * * *